US012639247B2

(12) United States Patent
Pan et al.

(10) Patent No.: US 12,639,247 B2
(45) Date of Patent: May 26, 2026

(54) TDISP SUPPORT IN A FPGA-EMBEDDED DEVICE

(71) Applicants:XILINX, INC., San Jose, CA (US); Advanced Micro Devices, Inc., Santa Clara, CA (US)

(72) Inventors: Chuan Cheng Pan, San Jose, CA (US); Jaideep Dastidar, Austin, TX (US); David James Riddoch, Cambridgeshire (GB); Andrew Jackson, Cambridge (GB); Anujan Varma, Cupertino, CA (US); James Anderson, Madison, AL (US)

(73) Assignees: XILINX, INC., San Jose, CA (US); Advanced Micro Devices, Inc., Santa Clara, CA (US)

( * ) Notice: Subject to any disclaimer, the term of this patent is extended or adjusted under 35 U.S.C. 154(b) by 61 days.

(21) Appl. No.: 18/408,303

(22) Filed: Jan. 9, 2024

(65) Prior Publication Data

US 2025/0225097 A1     Jul. 10, 2025

(51) Int. Cl.
| | |
|---|---|
| *G06F 13/42* | (2006.01) |
| *G06F 9/30* | (2018.01) |
| *G06F 9/455* | (2018.01) |

(52) U.S. Cl.
CPC ...... *G06F 13/4221* (2013.01); *G06F 9/30101* (2013.01); *G06F 9/45558* (2013.01); *G06F 2009/45579* (2013.01); *G06F 2009/45587* (2013.01)

(58) Field of Classification Search
CPC ................................................ G06F 13/4221
See application file for complete search history.

(56) References Cited

U.S. PATENT DOCUMENTS

| | | | | |
|---|---|---|---|---|
| 8,954,788 B2 * | 2/2015 | Abraham | ............ | G06F 11/0745 |
| | | | | 714/4.5 |
| 9,047,208 B1 * | 6/2015 | Moore | ............... | G06F 9/45533 |
| 9,836,421 B1 * | 12/2017 | Bshara | ............... | G06F 13/4282 |
| 2011/0029734 A1 * | 2/2011 | Pope | ...................... | H04L 49/90 |
| | | | | 710/316 |
| 2014/0237156 A1 * | 8/2014 | Regula | ............... | G06F 13/4022 |
| | | | | 710/314 |
| 2019/0034264 A1 * | 1/2019 | Radhakrishnan | ... | G06F 11/0751 |
| 2021/0034526 A1 * | 2/2021 | Pope | ................... | G06F 13/4282 |
| 2021/0209036 A1 * | 7/2021 | Govindarajan | ..... | G06F 13/4022 |
| 2022/0091872 A1 * | 3/2022 | Huilgol | ............... | G06F 9/45558 |
| 2023/0123082 A1 * | 4/2023 | Pandurangan | ...... | G06F 11/3051 |
| | | | | 710/104 |

(Continued)

*Primary Examiner* — Henry Tsai
*Assistant Examiner* — Aurangzeb Hassan
(74) *Attorney, Agent, or Firm* — Patterson + Sheridan, LLP

(57) ABSTRACT

Embodiments herein describe a circuit including a user domain configured to execute user functions and a hardened domain configured to communicate with the user domain. The hardened domain includes peripheral component interconnect express (PCIe) function decoding logic having a plurality of register bits and a Trusted Execution Environment (TEE) Device Interface Security Protocol (TDISP) core communicating with the PCIe function decoding logic. The TDISP core supports a plurality of PCIe functions. Each register bit of the plurality of register bits is assigned to a respective PCIe function of the plurality of PCIe functions.

20 Claims, 4 Drawing Sheets

(56)  References Cited

U.S. PATENT DOCUMENTS

| | | | |
|---|---|---|---|
| 2023/0205562 A1* | 6/2023 | Basak | G06F 13/4221 |
| | | | 718/1 |
| 2023/0289433 A1* | 9/2023 | Kakaiya | G06F 21/74 |
| 2023/0297410 A1* | 9/2023 | Sood | G06F 9/45558 |
| | | | 718/1 |
| 2024/0004990 A1* | 1/2024 | Kakaiya | G06F 9/45558 |
| 2024/0220622 A1* | 7/2024 | Kakaiya | G06F 21/57 |
| 2024/0378073 A1* | 11/2024 | Maroney | G06F 13/4221 |

* cited by examiner

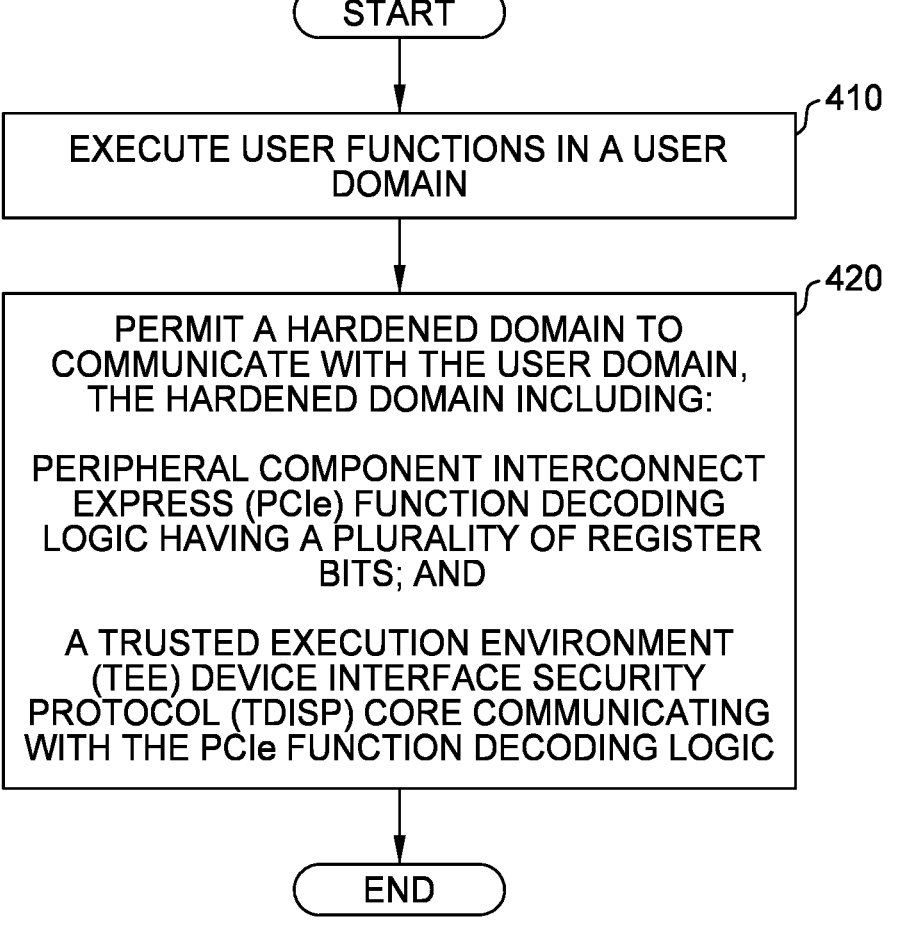

START

EXECUTE USER FUNCTIONS IN A USER DOMAIN ⟋410

PERMIT A HARDENED DOMAIN TO COMMUNICATE WITH THE USER DOMAIN, THE HARDENED DOMAIN INCLUDING:

PERIPHERAL COMPONENT INTERCONNECT EXPRESS (PCIe) FUNCTION DECODING LOGIC HAVING A PLURALITY OF REGISTER BITS; AND

A TRUSTED EXECUTION ENVIRONMENT (TEE) DEVICE INTERFACE SECURITY PROTOCOL (TDISP) CORE COMMUNICATING WITH THE PCIe FUNCTION DECODING LOGIC ⟋420

END

FIG. 4

TDISP SUPPORT IN A FPGA-EMBEDDED DEVICE

TECHNICAL FIELD

Examples of the present disclosure generally relate to confidential computing, and more particularly, to adding Trusted Execution Environment (TEE) Device Interface Security Protocol (TDISP) support in a field programmable gate array (FPGA)-embedded device.

BACKGROUND

With cloud computing, jobs are running on massive servers in hyperscale data centers, likely located far away from core operations. These data centers have an abundance of virtual machines running jobs from a number of different clients, all using different devices. Within the data center, a user is allocated a specific amount of memory and number of processor cores so that jobs and tasks are successfully completed.

Because these operations are not directly controlled, it is not clear whether someone inside the data center is acting maliciously. This is why hardware encryption inside virtual servers is needed, that is, the ability to communicate between virtual machine (VM) and hardware using a secure encryption key exchange where a third party, even one who owns, manages, and runs the data center day-to-day, doesn't have access to the encryption itself. Trusted Execution Environment (TEE) Device Interface Security Protocol (TDISP) is a new framework and architecture that can secure input/output (I/O) virtualization for data centers.

SUMMARY

One embodiment described herein is a circuit including a user domain configured to execute user functions and a hardened domain configured to communicate with the user domain. The hardened domain includes Peripheral Component Interconnect Express (PCIe) function decoding logic having a plurality of register bits and a Trusted Execution Environment (TEE) Device Interface Security Protocol (TDISP) core communicating with the PCIe function decoding logic. The TDISP core supports a plurality of PCIe functions. Each register bit of the plurality of register bits is assigned to a respective PCIe function of the plurality of PCIe functions.

One embodiment described herein is a method for executing user functions in a user domain and permitting a hardened domain to communicate with the user domain. The hardened domain includes peripheral component interconnect express (PCIe) function decoding logic having a plurality of register bits and a Trusted Execution Environment (TEE) Device Interface Security Protocol (TDISP) core communicating with the PCIe function decoding logic. The TDISP core supports a plurality of PCIe functions. Each register bit of the plurality of register bits is assigned to a respective PCIe function of the plurality of PCIe functions.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 illustrates a method for implementing the TDISP architecture.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
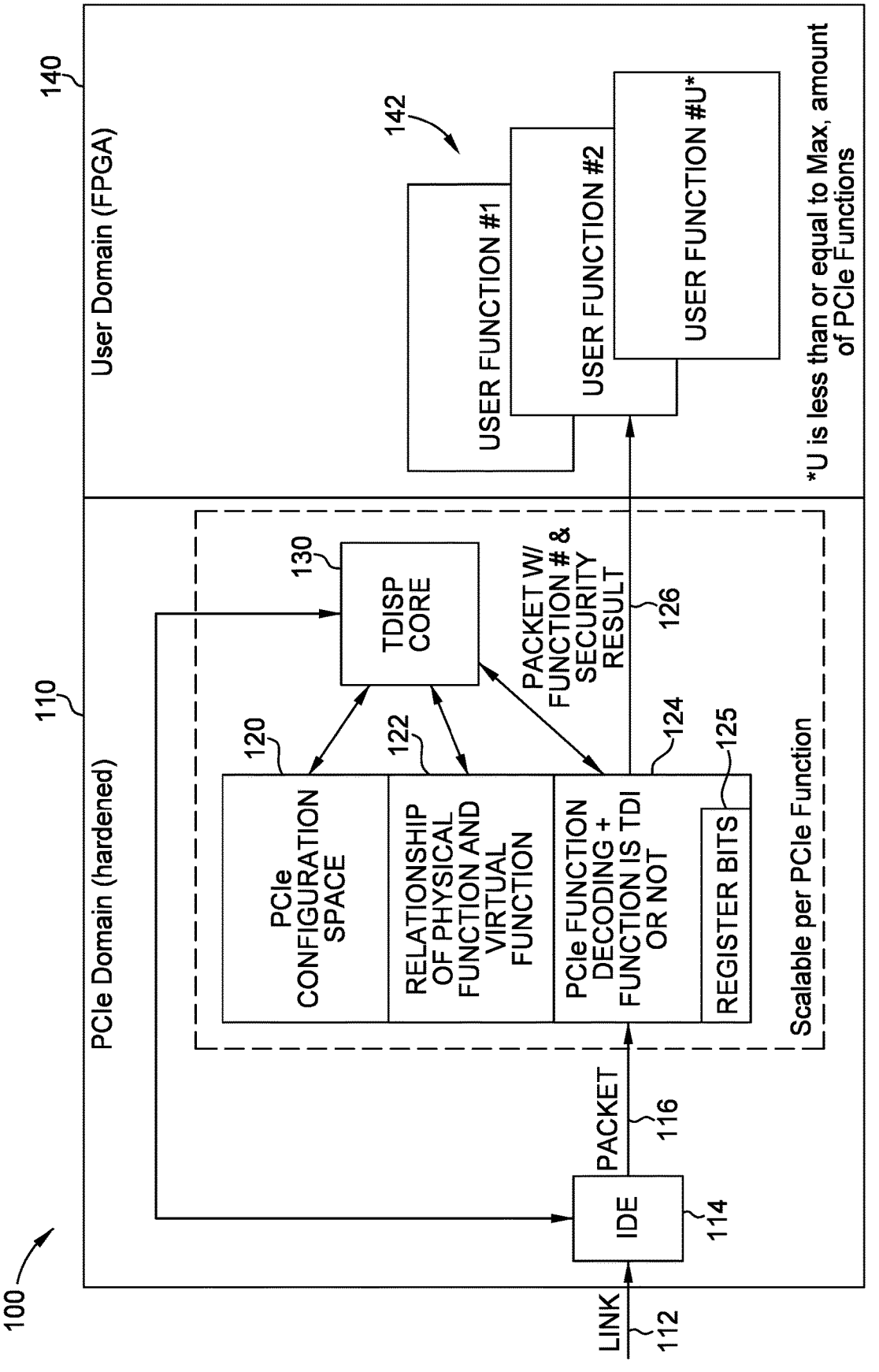
FIG. 1 illustrates a Trusted Execution Environment (TEE) Device Interface Security Protocol (TDISP) architecture, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe the TEE Device Interface Security Protocol (TDISP), which is a new security feature officially released in July 2022 by PCI-SIG. The PCI-SIG, or Peripheral Component Interconnect Special Interest Group, is an electronics industry consortium responsible for specifying the Peripheral Component Interconnect (PCI), PCI-X, and PCI Express (PCIe) computer buses. PCI-SIG has produced the PCI, PCI-X, and PCIe specifications.

PCI-SIG recently introduced a new Engineering Change Notice (ECN) extending the peripheral component interconnect express (PCIe) Base Specification to include optional support for trusted input/output (I/O) virtualization. Known as TDISP, this ECN ties together existing PCI-SIG technologies for Single-Root I/O Virtualization (SR-IOV) and hardware security via Integrity and Data Encryption (IDE).

PCIe is an interface standard for connecting high-speed components. Every desktop personal computer (PC) motherboard has a number of PCIe slots. PCIe slots come in different physical configurations such as x1, x4, x8, x16, x32. The number after the x indicates how many lanes (how data travels to and from the PCIe card) that PCIe slot has. A PCIe x1 slot has one lane and can move data at one data symbol per cycle. A PCIe x2 slot has two lanes and can move data at two data symbols per cycle (and so on). PCIe lanes are the physical link between the PCIe-supported device and the processor or chipset. PCIe lanes consist of two pairs of copper wires, known as traces that run through the motherboard connecting the PCIe-enabled device to either the processor or motherboard chipset.

The PCIe function is defined by a unique identifier, the function ID (FID). Each function specifies a function type (ROCE or ZEDC-EXPRESS) and a physical channel identifier (PCHID). Multiple functions may be specified to the same PCHID value provided that each of these functions defines a unique virtual function (VF) number.

In late 2021, PCI-SIG released an ECN titled IDE, which added optional capabilities for PCIe devices to perform hardware encryption and integrity checking on packets transferred across PCIe links. Fundamentally, the goal of IDE is to protect against hardware-level attacks conducted by skilled attackers with both sophisticated tools and direct access to their victim systems. In prior years, this scenario would have been viewed as highly unlikely, as companies owned and operated their own data centers, staffed them with their own trusted employees, and considered physical security to be of paramount importance. One result of the shift to "cloud computing" is that fewer and fewer companies fit that direct ownership model, with more and more of them relying on shared resources inside massive shared data centers, potentially located half the world away. The idea of an attacker with a cart filled with logic analyzers and oscilloscopes pulling the covers of running servers probing their internal busses now doesn't seem so far-fetched.

The IDE ECN is specifically geared to defeat such attackers equipped with laboratory equipment (e.g., bus analyzers) and even malicious dedicated hardware (such as interposer cards and co-opted PCIe switches). With the new ECN, PCIe devices can use defined Advanced Encryption Standard Galois Counter mode (AES GCM) algorithms to cryptographically sign and/or encrypt each packet transferred across the PCIe link. The two types of IDE Streams are "Link," which is valid only from one device directly connected to another, and "Selective," which is intended to be carried across PCIe switches. These two stream types can be combined with some links carrying both types, and other links only one type. One important protection this provides is that devices expecting to be directly connected via a Link IDE Stream will fail to establish a secure connection if a malicious PCIe switch is unexpectedly added in between them. Similarly, Selective IDE streams are carried unmodified across PCIe switches, meaning the switch itself cannot decrypt the data, so an attacker can at best make a copy of the encrypted data. Mechanisms within the IDE specification protect against further attacks such as forcing retries and injecting packets in attempts to force repeated transmission of the same data to expose the cryptographic keys being used.

When IDE was introduced, the new features provided essential building blocks for securing computing environments, but it was apparent that some sort of standardized framework would be needed to manage and provide interoperability amongst different implementations. The TDISP specification was developed to fill this need.

As the industry has evolved to support the kinds of shared data centers described above, the concept of Trusted Execution Environments (TEEs) has arisen in virtualization. Here, the idea is that the owner of a Virtual Machine (VM) may not want to trust the Virtual Machine Manager (VMM) (sometimes called a Hypervisor) in the same way a physical server owner might not want to trust the data center personnel. Within a TEE, the VMM still controls resource management as in a traditional virtual environment, but unlike a legacy VM, a TEE Virtual Machine (TVM) can manage its own security. For example, the VMM may allocate certain encryptable memory pages to the TVM, but it's the TVM that controls the encryption keys for those memory pages. On the central processing unit (CPU) and memory side of the server, these controls are specific to the CPU and memory architecture in use, so no new specifications are needed to expose them to the VMM. When the concept is extended to an I/O interface like PCIe, it's much more beneficial to have an open framework that doesn't require the VMM or TVM to have such specific knowledge of the devices being connected.

TDISP provides for the following main functions. TDISP establishes a trust relationship between a TVM and a TDISP-capable device, TDISP secures the PCIe path between the host and TDISP-capable device, and TDISP attaches/detaches a TDISP-capable device's interface to/from a TVM in a secure manner. TDISP currently focuses on using Virtual Functions as defined by the PCI-SIG Single-Root I/O Virtualization (SR-IOV) specification.

SR-IOV is a specification developed by PCI-SIG that allows a single PCIe physical device under a single root port to appear as multiple separate physical devices to a hypervisor or a guest operating system (OS). As such, a single device can be shared to multiple virtual machines (VMs). A single physical PCIe bus can be shared in a virtual environment using the SR-IOV specification. The SR-IOV offers different Virtual Functions to different virtual components (e.g., network adapter) on a physical server machine. SR-IOV uses Physical Functions (PFs) and Virtual Functions (VFs) to manage global functions for the SR-IOV devices. PFs have the ability to move data in and out of the device, while VFs are lightweight PCIe functions that support data flowing but also have a restricted set of configuration resources. The Virtual or Physical Functions available to the hypervisor or guest OS depend on the PCIe device. As such, the SR-IOV allows different VMs in a virtual environment to share a single PCIe hardware interface. SR-IOV further improves device performance for VMs.

The SR-IOV Virtual Function Base Address Registers (VF-BARs) set the base address register space for the Endpoint configuration. Each VF-BAR (0 through 5) configures the SR-IOV BAR aperture size and SR-IOV control attributes.

In Endpoint configuration, the core supports up to six 32-bit BARs or three 64-bit BARs for memory allocation. SR-IOV BARs can be one of two sizes. In 32-bit BARs, the address space can be as small as 16 bytes or as large as 2 gigabytes. In 64-bit BARs, the address space can be as small as 128 bytes or as large as 256 gigabytes.

SR-IOV enables a single physical device (for example, a single Ethernet port), to appear as multiple, separate, logical devices. A physical device with SR-IOV capabilities can be configured to appear in the PCI configuration space as multiple Functions. Each device has its own configuration space complete with BARs.

SR-IOV uses two types of PCI functions, that is, PFs and VFs.

PFs are full PCIe devices that include the SR-IOV capabilities. PFs are discovered, managed, and configured as normal PCI devices. PFs configure and manage the SR-IOV functionality by assigning VFs.

VFs are simple PCIe functions that only process I/O. Each VF is derived from a PF. The number of VFs a device may have is limited by the device hardware. A single Ethernet port, the physical device, may map to many VFs that can be shared to VMs.

Each VF can only be assigned to a single guest at a time, as VFs require real hardware resources. A VM can have multiple VFs. A VF appears as a network card in the same way as a normal network card would appear to an OS.

The SR-IOV drivers are implemented in the kernel. The core implementation is contained in the PCI subsystem, but there must also be driver support for both the PF and VF devices. An SR-IOV capable device can allocate VFs from a PF, The VFs appear as PCI devices which are backed on the physical PCI device by resources such as queues and register sets. SR-IOV devices can share a single physical port with multiple virtual machines.

When an SR-IOV VF is assigned to a VM, it can be configured to (transparently to the VM) place all network traffic leaving the VF onto a particular virtual local area network (VLAN). The VM cannot detect that its traffic is being tagged for a VLAN, and will be unable to change or eliminate this tagging.

VFs have near-native performance and provide better performance than virtualized drivers and emulated access. VFs provide data protection between VMs on the same physical server as the data is managed and controlled by the hardware. These features allow for increased VM density on hosts within a data center.

As such, while much of this functionality resides in software (or firmware), the TDISP specification requires a number of different behaviors and PCIe features in TDISP-capable devices. PFs are defined as PCIe functions, which include the SR-IOV capability structure and can therefore operate as the management entities for associated VFs. VFs were originally envisioned as lightweight functions which could be directly assigned to VMs, but which might rely on the VMM to emulate some aspects of their PCIe configuration space.

TDISP logically requires VFs not to rely on the VMM for any security-related functionality, and TDISP formalizes the idea of each VF as an assignable unit by defining a Trusted Device Interface (TDI), which encompasses the additional requirements placed on VFs to ensure security. Functions in TDISP devices must be able to lock down their TDI configuration and report tampering back to their associated TVM in case the VMM (or an attacker) should modify relevant control registers outside the negotiated TDISP scheme. Naturally, PCIe configuration space registers are part of the TDI, but also device-specific registers for functions such as memory mapping, caching, direct memory access (DMA), etc. must be secure from outside manipulation. TDISP also explicitly requires that devices' PFs not be able to tamper with any confidentiality and/or integrity features of their associated VFs, building on the idea that overall management functionality must not be able to impact the security of resources it manages.

The TDISP ECN defines two logical/software entities as part of the management infrastructure. TEE Security Manager (TSM), which exists in the host to enforce security policies on the host and attached devices and Device Security Manager (DSM), which exists in each TDISP device to enforce security policies on that device working in conjunction with the TSM.

TDISP is employed to increase confidential computing granularity to each VM and expands confidential computing's base to the device interface, which is connected to the trusted VM via the PCIe. TDISP is beneficial for virtualization-based data centers because TDISP protects a VM against attack from other VMs and isolates VMs from the host. Confidential computing is important for modern data centers, which are security focused. The exemplary invention adds TDISP support in a field programmable gate array (FPGA)-embedded device, which provides scalability on the number of PCIe functions and flexibility on which PCIe function becomes a trusted device interface. The exemplary invention further provides for an area efficient implementation method by using mostly firmware (instead of hardware) to save on the implementation area.

FIG. 1 illustrates a TEE Device Interface Security Protocol (TDISP) architecture, according to an example.

The TDISP architecture 100 includes a PCIe domain 110 and a user domain 140. The PCIe domain 110 can be referred to as a hardened domain and the user domain 140 can be referred to as an FPGA. A FPGA is a type of integrated circuit (IC) that can be programmed or reprogrammed after manufacturing. Stated differently, FPGAs are semiconductor devices that are based around a matrix of configurable logic blocks (CLBs) connected via programmable interconnects. FPGAs can be reprogrammed to desired application or functionality requirements after manufacturing. This feature distinguishes FPGAs from Application Specific Integrated Circuits (ASICs), which are custom manufactured for specific design tasks.

The PCIe domain 110 receives a link 112 via an Integrity and Data Encryption (IDE) 114, which provides packets 116 to block 124. A TDISP core 130 communicates with blocks 120, 122, 124. In particular, bidirectional communication is established between the TDISP core 130 and the PCIe configuration space 120. Bidirectional communication is also established between the relationship of physical functions (PFs) and virtual functions (VFs) block 122 and the TDISP core 130. Bidirectional communication is further established between the PCIe function decoding logic 124 and the TDISP core 130. The PCIe function decoding logic 124 also includes register bits 125. The PCIe function decoding logic 124 forwards the packets 116 with a function number and security result 126 to the user functions 142 of the user domain 140.

TDISP expands security to PCIe functions and allows granularity to each PCIe function, including VFs. FPGA-embedded devices support a large amount of functions to meet various customer needs and customers can implement their functions using FPGA logics. Conventionally, the TDISP design is built in the user domain for each function so that each function can monitor its security status. Each function will need to interact with underlying PCIe features such as the IDE and its VFs if the function itself is a PF with virtualization enabled.

However, in FPGA-embedded devices, the user domain uses FPGA logic and the underlying features are fixed in hardened IPs. Because of this programmable arrangement, the unknown implementation of user designs makes this conventional design a problem. For example, an association table (or mapping table) needs to be provided between PCIe functions and the TDI. The TDI can include, e.g., 256 state machines that need to be mapped to, e.g., 4K PCIe functions. As such, every packet coming into the system has a respective association number assigned to it to map it to a respective TDI. These mapping tables takes up precious real estate on the chip.

It is noted that soft IP refers to anything made from generic logic fabric, such as, but not limited to lookup tables (LUTs), flip-flops, etc., whereas hard IP refers to anything that is hard-wired and etched into the silicon, and that perform higher level functions. The user domain 140 includes the soft IP, whereas the PCIe domain 110 includes the hard IP. Additionally, not all PCIe functions require a security protection. Assigning a TDISP security entity (I.e., Trusted Device Interface) to a function across hardened IPs and user designs can also become a problem.

The TDISP architecture 100 in FIG. 1 resolves such issues by pulling in the TDISP design from the user domain to the hardened domain by embedding the design with the hardened PCIe function decoding logic 124 (i.e., SR-IOV base address register (BAR) logic) so that the maximum number of TDI can be scaled up according to the maximum configuration of PCIe functions. Within the scalable maximum configuration, users have the flexibility of implementing TDISP on functions they need using FPGA logic. In other words, the TDISP core 130 has been moved from the user domain 140 to the PCIe domain 110 (hardened domain) and can support the maximum number of PCIe functions. The system hardening process protects and secures the domain against cyberattacks by reducing the attack surface of the domain. The attack surface are the points in the system where an unauthorized attacked can attempt to enter. By moving the TDISP core 130 to the hardened domain, the attack surface of the system is reduced to further minimize points in the system from where an unauthorized attacker can enter.

The transfer of the TDISP core 130 from the user domain 140 to the PCIe domain 110 is accomplished by adding one register bit 125 (i.e., TDI Valid) per PCIe function to the hardened PCIe function decoding logic 124 (i.e., SR-IOV BAR logic) to indicate whether a function is a TDI. As such, no mapping table to record the assignment between the TDI and the PCIe functions is required. With the per-function bit (i.e., register bits 125), the TDISP design can support a per-function TDISP enablement, up to the maximum configuration of PCIe functions. Thus, no LUTs or mapping tables are necessary in the user domain 140. As such, the user domain 140 can include less soft IP. Stated differently, moving the TDISP core 130 from the soft IP to the hard IP, that is, from the user domain 140 to the PCIe domain 110, allows the removal of any LUTs or mapping tables in the soft IP as no mapping is necessary between the PCIe functions and the TDI in the soft IP. Instead, each PCIe function can be associated or assigned to a bit register 125 in the PCIe function decoding logic 124 in the hard IP. This allows maximum flexibility for the FPGA device provided to the customer, as the TDISP core 130 still allows for a maximum number of PCIe functions to be supported. Additionally, each PCIe function has the necessary security needed from being tampered with from an unauthorized user.

The advantages of transferring the TDISP core 130 from the user domain 140 to the PCIe domain 110, by embedding TDISP design with the existing PCIe function decoding logic 124 for SR-IOV, include at least leveraging the existing capability of the function decoding logic 124 to scale up and to save implementation area. TDISP can support the number of TDIs up to the maximum number of PCIe functions so that the FPGA embedded devices can still provide scalability on PCIe functions with TDIs when TDISP is supported. By adding per-function register bit 125 on top of the existing PCIe function decoding logic 124 for SR-IOV, the novel feature creates 1-to-1 mapping between the TDI and the PCIe functions to provide maximum flexibility on top of maximum scalability without the cost of mapping tables to record the assignment of TDIs. Because of the novel feature having the TDISP design implemented in the hardened PCIe logic, user implementations in FPGA don't need to probe into the underlying features like IDE 114, PCIe Configuration Space 120, the SR-IOV relationship between PFs and VFs 122, etc. Without all these communications across hardened IPs and user logics in the FPGA, the TDISP architecture 100 is feasible.

The advantages of transferring the TDISP core 130 from the user domain 140 to the PCIe domain 110, by embedding TDISP design with the existing PCIe function decoding logic 124 for SR-IOV, further include at least improving confidential computing by providing companies with a greater sense of confidence in the security of their data.

Regarding confidential computing, applications process data, and to do this, they interface with a computer's memory. Before an application can process data, it has to go through decryption in memory. Because the data is, for a moment, unencrypted, it is left exposed. The data can be accessed, encryption-free, right before, during, and right after it has been processed. This leaves the data exposed to threats like memory dump attacks, which involve capturing and using random access memory (RAM) put on a storage drive in the event of an unrecoverable error.

The attacker triggers this error as part of the attack, forcing the data to be exposed. Data is also exposed to root user compromises, which occur when the wrong person gains access to admin privileges and can therefore access data before, during, and after it has been processed.

Confidential computing fixes this issue by using a hardware-based architecture referred to as a trusted execution environment (TEE). This is a secure coprocessor inside a CPU. Embedded encryption keys are used to secure the TEE. To make sure the TEEs are only accessible to the application code authorized for it, the coprocessor uses attestation mechanisms that are embedded within. If the system comes under attack by malware or unauthorized code as it tries to access the encryption keys, the TEE will deny the attempt at access and cancel the computation. This allows sensitive data to stay protected while in memory. When the application tells the TEE to decrypt it, the data is released for processing. While the data is decrypted and being processed by the computer, it is invisible to everything and everyone else. The exemplary invention adds TDISP, which is a new security feature, to the confidential computing realm to further support, e.g., FPGA devices.

Although the exemplary invention mainly addresses the problem in FPGA-embedded devices with an architecture of mixing hardened IPs and user domains in FPGA logics, the exemplary invention can also be used in ASIC devices.

Figure 2:
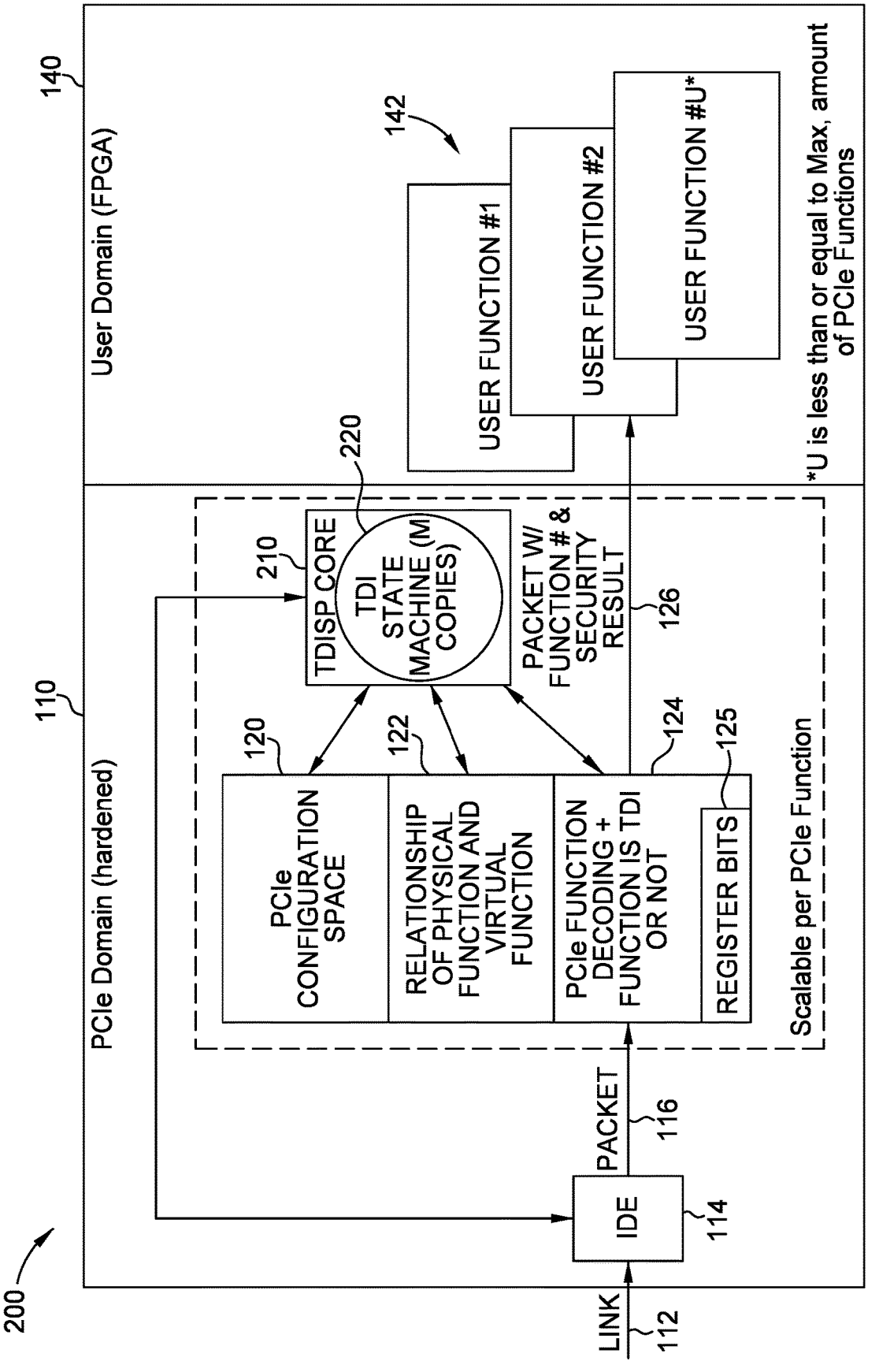
FIG. 2 is a TDISP architecture where the TDISP core includes a TDI state machine, according to an example.

FIG. 2 is a TDISP architecture where the TDISP core includes a TDI state machine, according to an example.

The TDISP architecture 200 includes a PCIe domain 110 and a user domain 140. The PCIe domain 110 can be referred to as a hardened domain and the user domain 140 can be referred to as an FPGA. The PCIe domain 110 receives a link 112 via an Integrity and Data Encryption (IDE) 114, which provides packets 116 to block 124. A TDISP core 210 communicates with blocks 120, 122, 124. In particular, bidirectional communication is established between the TDISP core 210 and the PCIe configuration space 120. Bidirectional communication is also established between the relationship of physical functions and virtual functions block 122 and the TDISP core 210. Bidirectional communication is further established between the PCIe function decoding logic 124 and the TDISP core 210. The PCIe function decoding logic 124 also includes the register bits 125. The PCIe function decoding logic 124 forwards the packets 116 with a function number and security result 126 to the user functions 142 of the user domain 140.

The TDISP core 210 can be a TDI state machine 220, in contrast to the TDISP architecture 100 of FIG. 1. The TDI machine 220 can support M copies, where M refers to the maximum number of PCIe functions that can be supported. TDISP is mainly scaled per PCIe function. To add TDISP to the maximum amount of PCIe functions supported by a FPGE-embedded device, it can cost a great deal if the device supports a large amount of PCIe functions. For example, if a device can support up to 4K functions, the TDISP implementation cost is 4K times the area which it needs for one single function. As such, adding one logic gate of a function for TDISP will result in 4K additional gates.

TDISP requires a TDI State Machine per TDI, in other words, per function. Based on this standard, the TDI State Machine has four states, which requires a minimum of 2 flip flops plus the combinational logics built around such flip flops. These state machines have to be referred and updated by many (more than two) checkers according to this standard. Memory-based implementation is not feasible because the port count of memories is up to two (i.e., dual-port memories).

To address the issue, firmware is added to maintain per-function TDI State Machines. Hardware only has a minimal implementation including the two flip flops to store the current state, the state transition to error state, which is detected by the hardware (all other state transitions are performed by firmware), and the error state sticky logic so it cannot be altered unless the firmware specifically moves to the initial state (i.e., Config_Unlocked). All other transition logics are performed by firmware to eliminate the per-function implementation. Moreover, the minimal per-function hardware is implemented in a hardened design (i.e., ASIC flow), which is much more area efficient compared to implementing it in FPGA logics.

The advantages of allowing more transition logics to be performed by firmware, instead of hardware, include removing most of the state transition logic from the hardware implementation to save area. Any logic is scaled to the maximum PCIe functions. Only two out of eleven transition arcs are kept in hardware, as will be described in further detail below with reference to FIG. 3. As such, advantages of using more firmware include implementing the remaining per-function logic in the hardened design by using ASIC flow which is much more area efficient compared to FPGA logics implementations.

Figure 3:
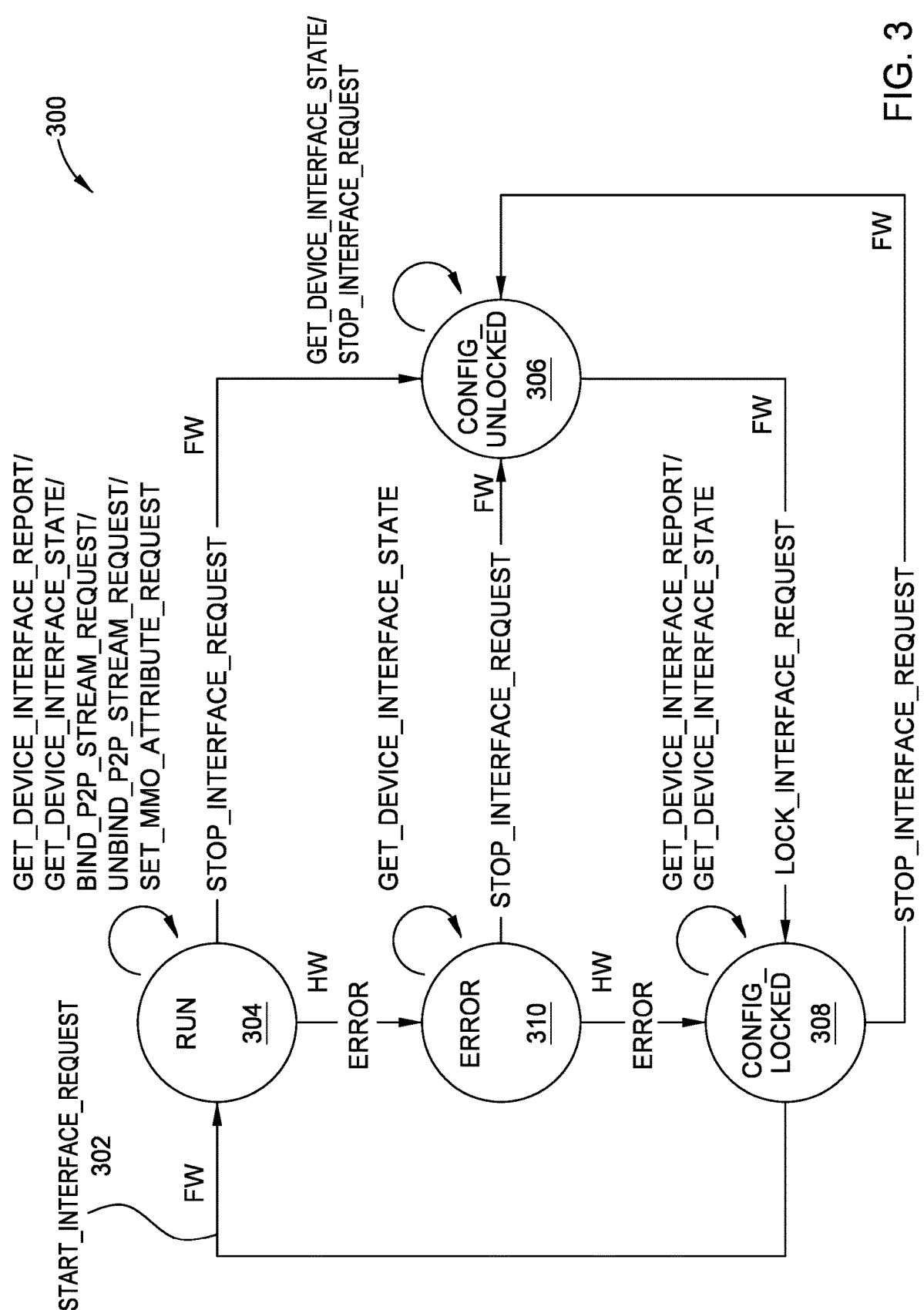
FIG. 3 illustrates the TDI state machine, according to an example.

FIG. 3 illustrates the TDI state machine, according to an example.

The TDI state machine 300 has four states. The first state 304, the second state 306, the third state 308, and the fourth state 310. The first state 304 is a run state. The second state 306 is a config_unlocked state. The third state 308 is a config_locked state. The fourth state 310 is an error state. The TDI state machine 300 stores the states of the TDI.

Each state transition requires logic built around it. Thus, each state 304, 306, 308, 310 has transition logic associated with it. The transition logic of each state 304, 306, 308, 310 enables the transition between the states. Requests can be implemented by using either hardware of firmware. Firmware is software that provides basic machine instructions that allow the hardware to function and communicate with other software running on the device. Firmware provides low-level control for a device's hardware. By transitioning more requests to firmware, as opposed to hardware, implementation area can be saved. As such, one firmware can run on the CPU, and, based on the state transition to update a state, a minimum number of requests need to be implemented in hardware.

In the instant case, only two transitions need to be implemented by hardware. The rest of the transitions can be implemented by using firmware. The first transition implemented in hardware relates to a run error. The second transition implemented in hardware relates to a config_locked error.

The start_interface_request 302 can be implemented by using firmware. The remaining requests can also be implemented in firmware, as opposed to hardware. Such requests include at least a stop_interface_request, a get_device_interface_state request, a get_device_interface_report, and a lock_interface_request. Other requests that use firmware can include bind_P2P_stream_request and unbind_P2P_stream_request. As such, a minimum hardware implementation is used to achieve the security features in the TDISP specification.

FIG. 4 illustrates a method for implementing the TDISP architecture.

At block 410, user functions are executed in a user domain. The user domain can be, e.g., an FPGA. In other examples, the user domain can be, e.g., an ASIC.

At block 420, a hardened domain is permitted to communicate with the user domain, the hardened domain including PCIe function decoding logic having a plurality of register bits and a TDISP core communicating with the PCIe function decoding logic. The hardened domain can be, e.g., a PCIe domain. The TDISP core supports a plurality of PCIe functions. Each register bit of the plurality of register bits is assigned to a respective PCIe function of the plurality of PCIe functions. Each register bit assigned to each respective PCIe function indicates whether the PCIe function is a Trusted Device Interface (TDI). Each register bit of the plurality of register bits is a TDI Valid bit. The TDISP core supports a number of TDIs up to a maximum number of PCIe functions. Additionally, a one-to-one mapping is created between the number of TDIs and the number of PCIe functions without using mapping tables.

Confidential computing refers to cloud computing technology that can isolate data within a protected CPU while it is being processed. Within the CPU's environment is the data that the CPU processes and the methods used to process this data. This is only accessible to specially authorized, for the purpose of providing privileged access, programming code. The CPU's resources are otherwise invisible and cannot be discovered by any program or person, and that applies to the cloud provider as well. More and more, organizations are turning to hybrid and public cloud services, making it more important than ever to find data privacy solutions. The main objective of confidential computing involves providing companies with a greater sense of confidence in the security of their data. Companies need to know they are well-protected and that the data can be kept confidential before they can feel comfortable moving such data to a cloud environment. The exemplary invention uses TDISP to increase confidential computing granularity to each VM and expand confidential computing's base to the device interface, which is connected to the trusted VM via the PCIe.

In conclusion, designers developing system-on-chips (SoCs) for hyperscale data centers and other security-conscious applications should review the TDISP specification with their customers to see if it can improve the overall security of their systems. TDISP offers optional support for trusted I/O virtualization and ties together with existing PCI-SIG technologies for SR-IOV and hardware security via IDE. Implementers of TDISP need to pay close attention to mechanisms for securing their DSMs and take note of changes which may be necessary to any pre-existing IDE implementations. The exemplary invention uses TDISP to increase confidential computing granularity to each VM and expand confidential computing's base to the device interface, which is connected to the trusted VM via the PCIe. TDISP is beneficial for virtualization-based data centers because TDISP protects a VM against attack from other VMs and isolates VMs from the host. The exemplary invention further adds TDISP support in a FPGA-embedded device, which provides scalability on the number of PCIe functions and flexibility on which PCIe functions become a TDI. The exemplary invention also provides for an area efficient implementation method by using more firmware (instead of hardware) to save on the implementation area. This is accomplished by having more or most of the transition logic being performed by firmware instead of hardware.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:
1. A circuit comprising:
a user domain configured to execute user functions; and
a hardened domain configured to communicate with the user domain, the hardened domain including:
peripheral component interconnect express (PCIe) function decoding logic having a plurality of register bits, each register bit assigned to a respective PCIe function of a plurality of PCIe functions; and
a Trusted Execution Environment (TEE) Device Interface Security Protocol (TDISP) core communicating with the PCIe function decoding logic, wherein the TDISP core supports the plurality of PCIe functions.
2. The circuit of claim 1, wherein each register bit of the plurality of register bits is configured to indicate whether a corresponding PCIe function is enabled as a Trusted Device Interface (TDI) for secure communication under the TDISP.

3. The circuit of claim 2, wherein the TDISP core is configured to enable or disable TDISP support for each PCIe function based on the corresponding register bit in the PCIe function decoding logic.
4. The circuit of claim 1, wherein each register bit of the plurality of register bits is a TDI Valid bit indicating TDISP enablement.
5. The circuit of claim 1, wherein the TDISP core supports a number of TDIs up to a maximum number of PCIe functions.
6. The circuit of claim 5, wherein a one-to-one mapping is created between the number of TDIs and the number of PCIe functions without using mapping tables.
7. The circuit of claim 1, wherein the TDISP core includes a TDI state machine.
8. The circuit of claim 7, wherein the TDI state machine includes four states for each TDI or for each PCIe function.
9. The circuit of claim 8, wherein most state transition logic of the four states is implemented by firmware.
10. The circuit of claim 8, wherein error state transition logic of the four states is implemented by using hardware.
11. The circuit of claim 1, wherein the user domain is a field programmable gate array (FPGA)-embedded device and the hardened domain is a PCIe domain.
12. The circuit of claim 1, wherein the PCIe function decoding logic is Single-Root input/output (I/O) Virtualization (SR-IOV) logic.
13. A method comprising:
executing user functions in a user domain; and
permitting a hardened domain to communicate with the user domain, the hardened domain including:
peripheral component interconnect express (PCIe) function decoding logic having a plurality of register bits, each register bit assigned to a respective PCIe function of a plurality of PCIe functions; and
a Trusted Execution Environment (TEE) Device Interface Security Protocol (TDISP) core communicating with the PCIe function decoding logic, wherein the TDISP core supports the plurality of PCIe functions.
14. The method of claim 13, wherein each register bit of the plurality of register bits is configured to indicate whether a corresponding PCIe function is enabled as a Trusted Device Interface (TDI) for secure communication under the TDISP.
15. The method of claim 14, wherein the TDISP core is configured to enable or disable TDISP support for each PCIe function based on the corresponding register bit in the PCIe function decoding logic.
16. The method of claim 13, wherein the TDISP core supports a number of TDIs up to a maximum number of PCIe functions and wherein a one-to-one mapping is created between the number of TDIs and the number of PCIe functions without using mapping tables.
17. The method of claim 13, wherein the TDISP core includes a TDI state machine, the TDI state machine including four states for each TDI or for each PCIe function and wherein most state transition logic of the four states is implemented by firmware.
18. The method of claim 13, wherein the user domain is a field programmable gate array (FPGA)-embedded device and the hardened domain is a PCIe domain.
19. The circuit of claim 1, wherein the TDISP core is configured to maintain, for each PCIe function, a TDI state comprising a plurality of states stored in hardened-domain hardware, while transition logic for the TDI state is executed by firmware to reduce hardware area.

20. The method of claim 13, wherein the TDISP core is configured to maintain, for each PCIe function, a TDI state comprising a plurality of states stored in hardened-domain hardware, while transition logic for the TDI state is executed by firmware to reduce hardware area.

\* \* \* \* \*